(12) United States Patent
Rivera

(10) Patent No.: US 7,407,297 B2
(45) Date of Patent: Aug. 5, 2008

(54) IMAGE PROJECTION SYSTEM AND METHOD

(75) Inventor: Ricardo Rivera, Philadelphia, PA (US)

(73) Assignee: Klip Collective, Inc.

( * ) Notice: Subject to any disclaimer, the term of this patent is extended or adjusted under 35 U.S.C. 154(b) by 443 days.

(21) Appl. No.: 11/200,906

(22) Filed: Aug. 10, 2005

(65) Prior Publication Data

US 2006/0038814 A1    Feb. 23, 2006

Related U.S. Application Data

(60) Provisional application No. 60/602,544, filed on Aug. 18, 2004.

(51) Int. Cl.
*G03B 21/14* (2006.01)

(52) U.S. Cl. .................... 353/121; 353/69; 353/28; 345/419; 345/653

(58) Field of Classification Search .......... 353/28, 353/30, 121, 69; 345/419, 418, 653, 420, 345/629
See application file for complete search history.

(56) References Cited

U.S. PATENT DOCUMENTS

| | | | |
|---|---|---|---|
| 4,981,360 A | | 1/1991 | Schwarz |
| 5,161,013 A | | 11/1992 | Rylander et al. |
| 5,694,142 A | * | 12/1997 | Dumoulin et al. ............ 345/9 |
| 5,795,046 A | | 8/1998 | Woo |
| 6,000,801 A | * | 12/1999 | Dillon et al. ................ 353/28 |
| 6,431,711 B1 | | 8/2002 | Pinhanez |
| 6,677,956 B2 | * | 1/2004 | Raskar et al. ............... 345/581 |
| 6,709,116 B1 | | 3/2004 | Raskar et al. |
| 6,712,477 B2 | | 3/2004 | Idaszak et al. |
| 6,793,350 B1 | | 9/2004 | Raskar et al. |
| 6,811,264 B2 | | 11/2004 | Raskar et al. |
| 7,182,465 B2 | * | 2/2007 | Fuchs et al. .................. 353/69 |
| 2003/0098957 A1 | | 5/2003 | Haidiman |
| 2003/0231261 A1 | | 12/2003 | Bassi et al. |
| 2004/0141157 A1 | | 7/2004 | Ramachandran et al. |
| 2004/0169827 A1 | | 9/2004 | Kubo et al. |
| 2005/0017967 A1 | * | 1/2005 | Ratti et al. .................. 345/418 |
| 2005/0243085 A1 | * | 11/2005 | Schechter et al. ........... 345/419 |

* cited by examiner

*Primary Examiner*—Willaim C. Dowling
(74) *Attorney, Agent, or Firm*—Brian L. Belles; Buchanan Ingersol & Rooney PC

(57) ABSTRACT

A system and method of mapping and/or projecting images onto a three-dimensional architecture. In one aspect, the invention a method of mapping and/or projecting imagery onto a three-dimensional architecture comprising: a) identifying a projection location from which a line of sight exists to one or more desired surfaces of the architecture; b) securing a projection device in a fixed orientation in the projection location; c) operably coupling the projection device to a computer device, the computer device comprising a video compositing application; d) opening a composition window of the video compositing application, the composition window being displayed on a display module; e) projecting content of the composition window onto the architecture; f) inserting a matte into the composition window, an image of the matte being projected onto the architecture; and g) adjusting the size, shape, position, orientation, or any combination thereof of the matte within the composition window until edges of the projected image of the matte become aligned with edges of one of the desired surfaces of the architecture.

20 Claims, 9 Drawing Sheets

IMAGE PROJECTION SYSTEM AND METHOD

CROSS-REFERENCE TO RELATED PATENT APPLICATIONS

The present application claims the benefit of U.S. Provisional Patent Application 60/602,544, filed Aug. 18, 2004, the entirety of which is incorporated herein by reference.

FIELD OF INVENTION

The present invention relates generally to the field of mapping and/or projecting images onto display surfaces, and specifically to the systems and methods for mapping and/or projecting images onto a three-dimensional architecture.

BACKGROUND OF THE INVENTION

Conventional systems and methods of projecting images onto flat display surfaces are well-known. In the most simple example, a projector is positioned at a desired distance from a flat display surface so that the projector is substantially normal to the surface (i.e., the projection angle is normal to the display surface). Suitable flat surfaces often include movie screens, walls, ceilings, etc. Because the projection angle is substantially normal to the display surface, and because the display surface is substantially flat, projected images will not experience significant optical distortion.

The projection of images onto more complex surfaces, such as curved, angled, or adjoining non-coplanar surfaces, is also known. Conventional projection systems and methods, however, can not project images onto such surfaces without substantial optical distortion of the image. When a conventional projection system/method is used to project images onto such complex surfaces, optical distortion of the image results from the projection angle being other than normal for at least a portion of the display surface. Thus, distortion of the projected image is perceived when conventional projection systems/methods are used to project onto adjacent walls, adjacent walls and ceilings, non-planar surfaces, non-coplanar surfaces, curved surfaces, or the like. Thus, conventional projection systems/methods are limited to projecting images on display surfaces where the projection angle is normal to the display surface and the display surface is substantially flat.

In order to compensate for the optical distortion resulting from the projection angle being other than normal to the display surface and/or the display surface being other than flat, advanced projections techniques and systems have been developed to compensate for these optical distortion problems (such as those projections systems used to project images onto broad, curved screens, such as in IMAX theaters). Existing projection systems address the distortion problem through digital manipulation techniques that alter the dimensions of the still images or video. One such digital manipulation technique that is well known in the art is that of "keystoning."

During a keystone digital correction technique, the dimensions of the image to be projected onto the display surface are altered so that the image appears distorted prior to projection, often into the shape of a keystone. When the distorted image is then projected onto an angled display surface (or at a projection angle other than normal), the image appears undistorted on the display surface from the viewer's perspective.

Such projection systems are limited in direction, area of projection, and the number of surfaces or objects within the area of projection upon which an image is capable of being displayed. Moreover, many such systems must be manually manipulated as an initial step in order to allow for the projection image to be seen on adjacent walls without the appearance of distortion. Furthermore, such systems are limited in that they can only project on adjacent surfaces, e.g., wall and adjacent wall, wall and adjacent ceiling, or the like. Such systems cannot project images onto multiple non-contiguous and/or non-adjacent surfaces within a three-dimensional area. In order to accomplish the projection of images on multiple non-contiguous and/or non-adjacent surfaces, multiple projection devices must be employed.

Finally, it is not known to project continuous video images onto adjacent walls or flat screens joined at corners. Home, office and theater projection is currently limited to single contiguous surfaces, because images cannot be projected onto adjacent walls or onto walls and ceilings without distortion. Thus, there is a need for coordinated projection of video or digitized film simultaneously onto multiple surfaces joined at corners.

SUMMARY OF THE INVENTION

It is therefore an object of the present invention to provide a system and method that can project images onto non-coplanar and non-adjacent surfaces of an architecture without optical distortion.

Another object of the present invention is to provide a system and method of projecting images onto surfaces in such a manner that the image appears to be floating.

Yet another object of the present invention is to provide a system and method of projecting images that provides an efficient and simple way of mapping the surfaces of an architecture onto which images are to be displayed.

Still another object of the present invention is to provide a system and method of projecting images that projects different visual elements onto specific areas and surfaces of an architecture from one projection source.

A further object of the present invention is to provide a system and method of projecting images that can coordinate projection of video and/or digitized film simultaneously onto multiple surfaces joined at corners.

A yet further object of the present invention is to provide a system and method of projecting images that masks those surfaces of the architecture that are not being used for the display of images.

A still further object of the present invention is to provide a system and method of projecting images that creates a map of the architecture that can be re-used.

Another object of the present invention is to provide a system and method of projecting images that integrates architecture, light, and darkness into an immersive environment.

These and other objects are met by the present invention, which in one aspect, is a method of mapping and/or projecting imagery onto a three-dimensional architecture comprising: a) identifying a projection location from which a line of sight exists to one or more desired surfaces of the architecture; b) securing a projection device in a fixed orientation in the projection location; c) operably coupling the projection device to a computer device, the computer device comprising a video compositing application; d) opening a composition window of the video compositing application, the composition window being displayed on a display module; e) projecting content of the composition window onto the architecture in real time; f) inserting a matte into the composition window, an image of the matte being projected onto the architecture; and g) adjusting the size, shape, position, orientation, or any combination thereof of the matte within the composition window until edges of the projected image of the matte become aligned with edges of one of the desired surfaces of the architecture. In one embodiment, the method can further comprise repetitively performing steps e) through g) for all desired surfaces of the architecture.

The alignment of the edges of the projected image of the matte with the edges of the desired surface of the architecture is preferably performed by adjusting the matte within the composition window and visually monitoring the effect that the adjustment has on position of the edges of the projected image of the matte on the architecture. This visual observation, coupled with further adjustment of the matte within the composition window if necessary, is performed until the edges of the projected image of the matte are aligned with the edges of the desired surface of the architecture on which that matte is projected. As a result, optical distortions of the shape and size of the projected image of the matte that may result from the angled and/or non-planar display surfaces of the architecture are eliminated.

In a further embodiment, imagery content can be inserted into one or more of the mattes. As a result, the imagery content will be projected onto the surface of the architecture corresponding to the matte in which the imagery content is inserted. In such an embodiment, it may be preferable to further adjust the internal properties of those mattes whose imagery content is projected onto angled, non-coplanar, and/or non-planar surfaces of the architecture to substantially alleviate optical distortion of the projected imagery content on those surfaces. This can be done by using tools within the video compositing application, including, without limitation, rotating, scaling, corner pinning, skewing, or any combination thereof.

As with the adjustments made for the size and shape of the projected image of the matte itself, the adjustments of the internal properties of the matte are preferably performed by visually monitoring the effect that such adjustments have on the optical distortion of the projected imagery content on the architecture.

In one embodiment, the method can further include storing the composition window to a memory medium. Storing the composition window will include the storage of all imagery content that is associated with the mattes so that the imagery content can be projected onto the architecture at a later time.

In some embodiments, a black masking background layer is preferably applied to the composition window prior to inserting a matte. Using a black masking layer as the background layer creates the illusion of an absent video projector/feed (i.e., the negative space is projected as black) on those surfaces of the architecture that are to be free of imagery. Furthermore, when imagery content is added to the mattes atop the black masking layer, the increased contrast ratio of the projector results in a more convincing illusion. Thus, the insertion of imagery content will result in the appearance that the images are "floating" when projected onto the surfaces of the architecture. This masking technique also breaks the bounds of traditional video projection that is confined to the 3:4 aspect ratio.

In other embodiments, the invention can further comprise storing the contents of the composition window, including all imagery content associated with the mattes, to a memory medium; disconnecting the computer device from the projector device; connecting an electronic device capable of reading the memory medium to the projector device; coupling the portable memory medium to the electronic device; and projecting the content of the composition window onto the architecture from the memory medium. Preferably, the imagery content in the mattes is looped so as to facilitate continuous projection/display.

In another aspect, the invention can be a system for mapping and/or projecting imagery onto non-coplanar surfaces of a three-dimensional architecture comprising: a) a projection device secured in a fixed orientation at a location from which a line of sight exists to one or more desired surfaces of the architecture; b) a computer device having a display module and a video compositing application, the computer device operably coupled to the projector; c) wherein the video compositing application comprises a composition window, wherein the computer device is adapted to transmit content of the composition window to the projector device for display on the architecture in real time; d) means for inserting a matte into the composition window; and e) means for adjusting the size, shape, position, orientation, or any combination thereof of the matte within the composition window, thereby resulting in edges of a projected image of the matte being correspondingly adjusted on the architecture in real time.

In one embodiment, the computer device can be a laptop and the display module can be a computer screen. The computer device can be operably coupled to the projection device with an analog-digital converter, such as a video camera or other device.

In some embodiments, it may be preferred that the system further comprise means for applying a black masking background layer to the composition window, means for inserting imagery content into one or more of the mattes; means for adjusting properties of mattes whose imagery content is projected onto angled, non-coplanar, and/or non-planar surfaces of the architecture to substantially alleviate optical distortion; and/or means for storing the composition window onto a memory medium.

DETAILED DESCRIPTION OF THE DRAWINGS

Figure 1:
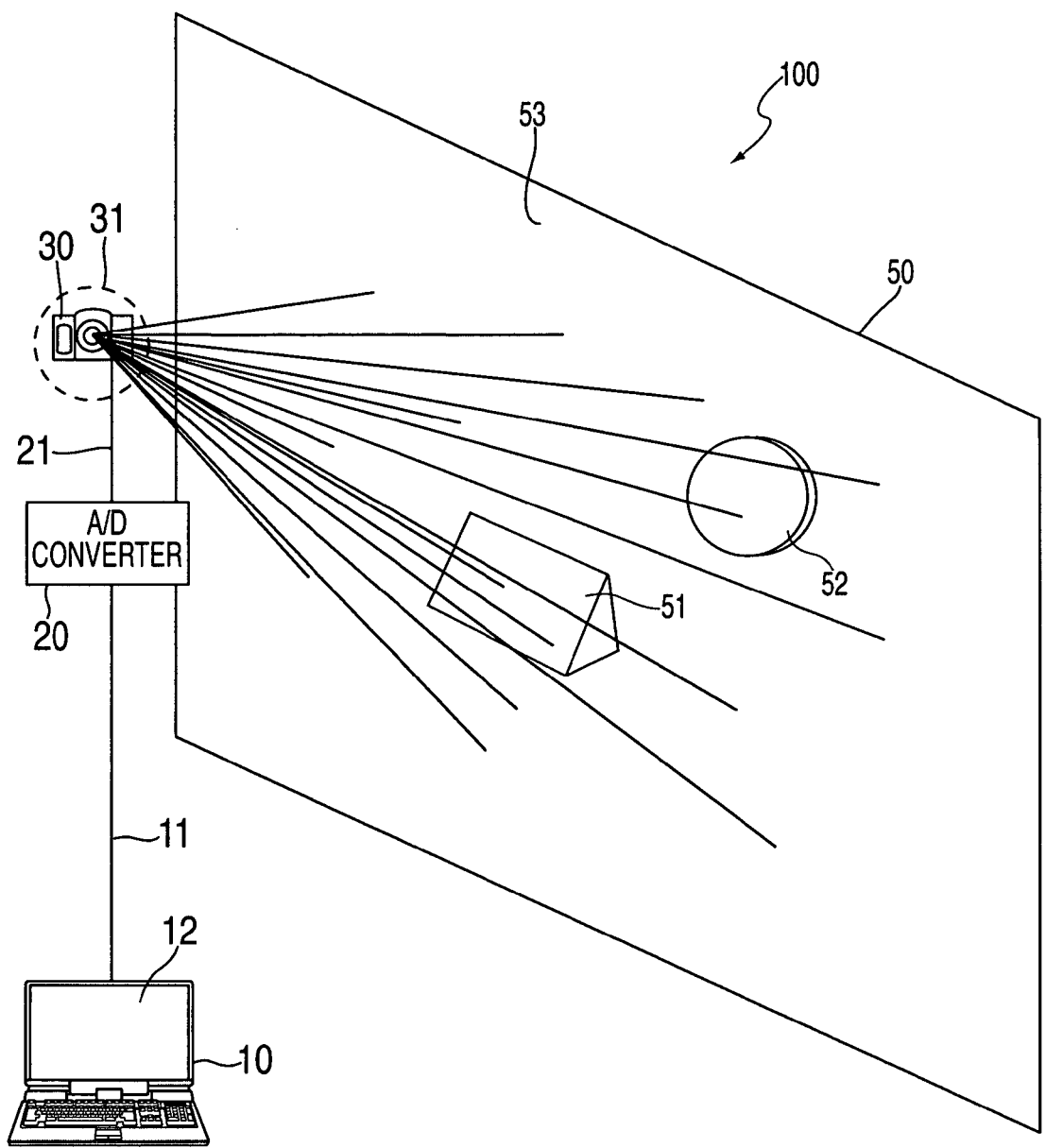
FIG. 1 is a schematic of an image projection system according to an embodiment of the present invention.

FIG. 1 illustrates an image projection system 100 according to an embodiment of the present invention. In addition to being able to project different visual elements (i.e., imagery content) onto objects/architectures, the image projection system 100 also has the capabilities to map the surfaces of the such three-dimensional architectures. As will be described in detail below, the image projection system 100 can project imagery content onto a plurality of non-coplanar and non-adjacent surfaces of an architecture without the imagery content experiencing optical distortion.

The image projection system 100 can be used to project all kinds of imagery content, including, without limitation, still photographs, video clips, still digital images, streaming digital video, movies, or any other visual content. Preferably, video clips that have no camera movement (which lends itself to the illusion), ambient images (basically a moving photograph), "loopable" clips (in point and out point matched), and "floaters" (clips shot in front of a black backdrop) are used.

In utilizing the image projection system 100, imagery content can be projected onto different surfaces of the architecture as a plurality of separate images or as a coordinated single image. Moreover, if desired, the image projection system 100 can be modified to simultaneously generate audio that corresponds to the imagery content being displayed. Depending on the nature of the imagery content being displayed, the addition of audio can enhance an observer's sensory experience and/or make the projected illusion more believable. This can be done by adding a separated stereo system, by coupling speakers to the laptop computer 10, or by activating speakers built into the laptop computer 10.

The image projection system 100 comprises a laptop computer 10, an analog/digital ("A/D") converter 10, and a video projector 30. While a laptop computer 10 is illustrated, any other type of computer or processing unit can be used that is capable of performing the functions described throughout this application. The exact processing capabilities, memory needs, and hardware requirements of the laptop computer will be dictated on a case-by-case basis, taking into consideration such factors as the complexity of the architecture being mapped and the complexity of the imagery content to be projected.

The laptop computer 10 is operably connected to the A/D converter 20 via a connector cable 11, such as a firewire, a DSL cable, a fiberoptic line, an s-video cable, or the like. Preferably, a high speed data transmission line is used. Utilizing a high speed port, such as a firewire port, makes it possible to transmit date to the projector 30 from the laptop computer 10, and project the corresponding imagery onto the architecture in real time.

The A/D converter 20 is in turn operably connected to the projector via a connector cable 21, such as an s-video cable or the like. The invention is not, however, limited to any specific type of connection cable so long as the components of the system 100 can operably communicate with one another and/or transmit data therebetween. In an alternative embodiment, any and/or all operable connections can be wireless, utilizing radio frequency ("RF") signals, infra-red ("IR") signals, or the like.

Moreover, while an A/D converter 20 is used to facilitate data transmission/communication between the laptop computer 10 and the video projector 30, any digital video ("DV") device may be used. For example, in some embodiments of the invention, it may be preferable to use a mini-DV digital camera in place of the A/D converter 20 because the mini-DV digital camera can act as a real time converter. In other words, the mini-DV digital camera can create an accurate registration of the video mapping, and implementation thereof, such that the camera keeps the video aspect ratio and alignment proper and calibrated. While utilizing a DV device that allows real time conversion of data transmitted to the video projector 30 from the laptop computer 10 is preferred, the invention is not so limited.

The laptop computer 10 has a video compositing software application or a similar program loaded thereon. One example of a video compositing application suitable for use with the present invention is Adobe® After Effects®. The video compositing application allows a user to see in real-time to a video source. When the image projection system 100 is functioning, the video compositing application allows a user to essentially see on the display screen 12 of the laptop computer 10 (and control in real time) what is being projected onto the surfaces of the architecture 50 itself. This is exemplified in FIGS. 2A-7B.

The image projection system 100 enables a user to utilize a single projector 30 to cast imagery content on multiple surfaces of the three-dimensional architecture 50, such as the surfaces 51-53. The image projection system 100 compensates for distortions when projecting onto the non-coplanar and/or non-adjacent surfaces within the three-dimensional architecture 50, integrating architecture, light, and darkness into an immersive environment.

Figure 8:
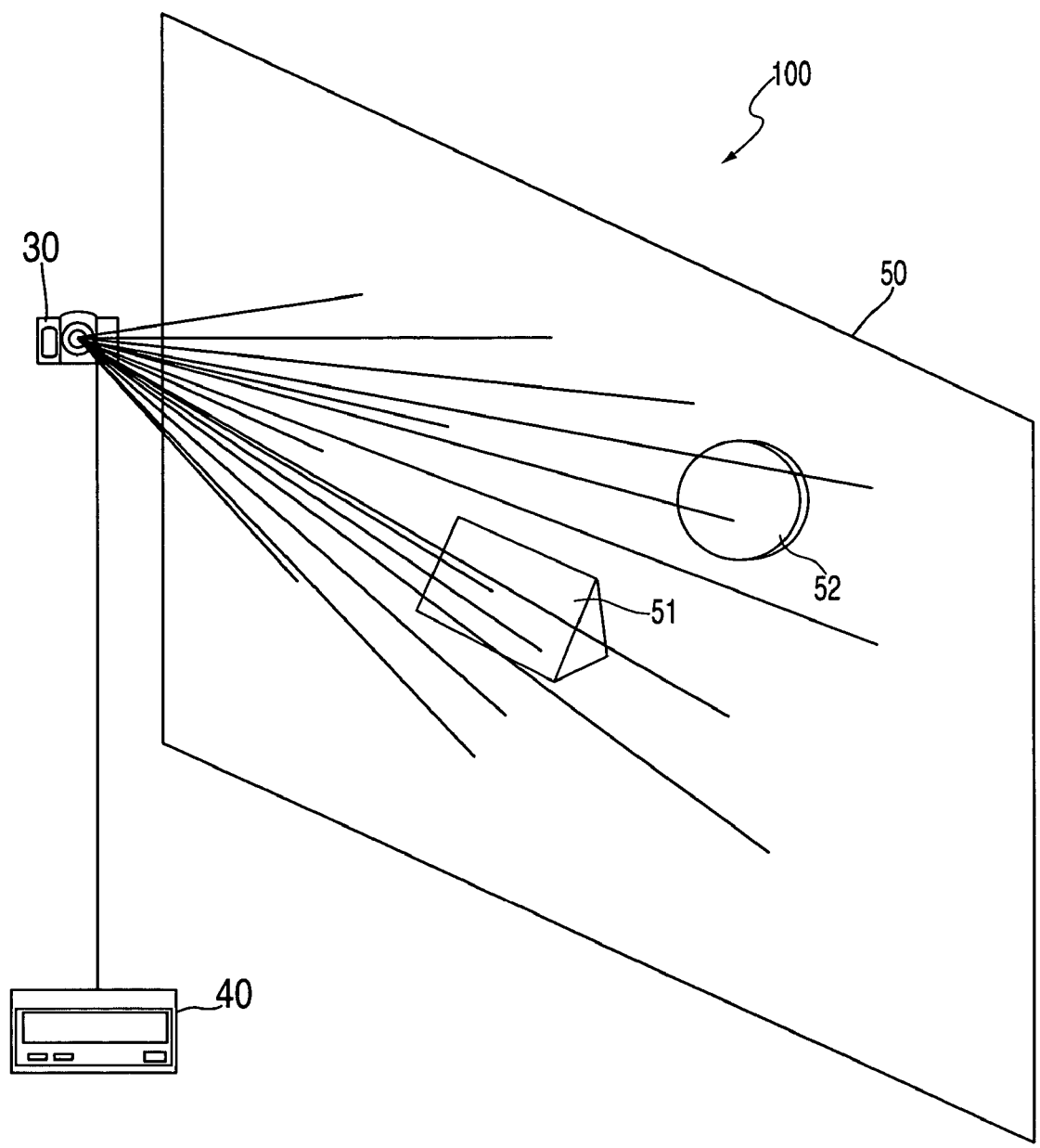
FIG. 8 is a schematic of the image projection system of FIG. 1 wherein the laptop computer and A/D converter is replaced with a DVD player.
Figure 9:
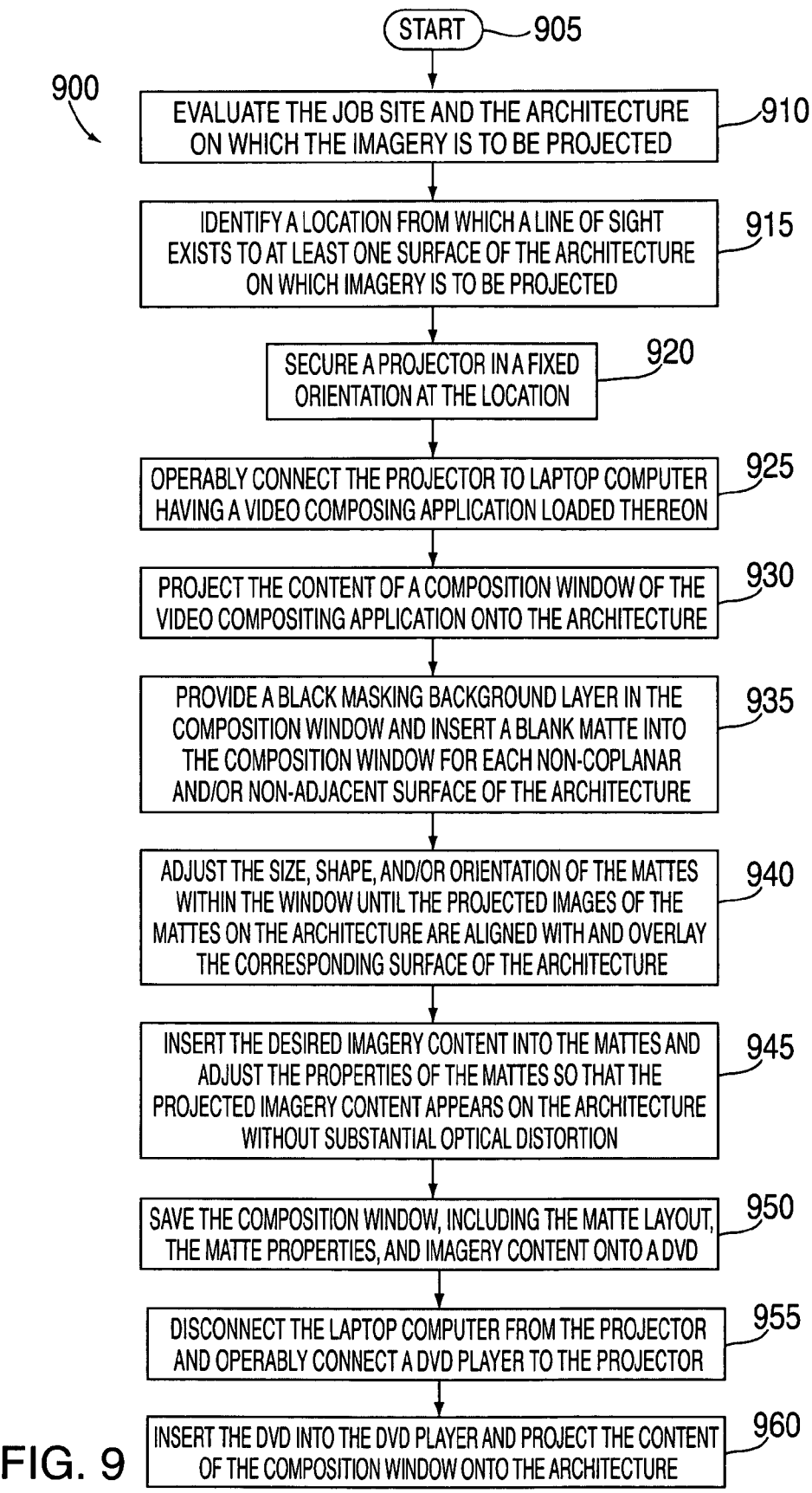
FIG. 9 is a flowchart of an image mapping and projection method according to an embodiment of the present invention.

Referring now to FIG. 9, a flowchart of a method for mapping the architecture of the architecture 50, and for projecting imagery content onto the architecture 50 based on the map created, is illustrated according to an embodiment of the present invention. For ease of discussion, the inventive method of FIG. 9 will be described below in relation to the image projection system 100 of FIG. 1, the various interfaces shown in FIGS. 2A-7A, and the image projection system 800 of FIG. 8. However, those skilled in the art will appreciate that the method of the present invention is not limited to any specific system, hardware, software, or arrangement of components.

Referring to FIG. 1, once an architecture is identified on which imagery content is to be projected, the user of the image projection system 100 evaluates the architecture 50 and identifies the surfaces of the architecture 50 that are to be projected on, thereby completing step 910 of FIG. 9. In the example, it is desired to project imagery content onto the circular surface 52 and the rectangular surface 51. The surfaces 51 and 52 are non-coplanar and non-adjacent to one another.

The user then identifies a location 31 at the work site from which a line-of-sight exists to at least one of the surfaces 51, 52, completing step 915 of FIG. 9. When possible, it is preferred that a location be identified from which a line-of-sight exists to all of the surfaces 51, 52 on which imagery content is to be projected. In those instances where a location does not exists that affords a line of sight to the entirety of all of the surfaces of an architecture on which imagery is to be projected, additional projectors can be utilized. In such embodiments, the mapping and projection processes discussed herein will be performed for all of the projectors, and the projection of the imagery content by the different projectors will be coordinated.

Once a location 31 is identified from which a line-of-sight exists to the desired surfaces 51, 52, the video projector 30 is secured at the location 31. The video projector 30 is secured at the location 31 in a fixed orientation that affords the video projector 30 the ability to project imagery content onto the surfaces 51, 52, thereby completing step 920 of FIG. 9. This "locking-down" of the projector device 30 is performed prior to any video or other image content being rendered.

In traditional prior art projections systems, the video projection/presentation is utilized after all the video is produced. However, with the present invention, the video projector 31 is preferably "locked-down" in place before the video production begins. As discussed below, it is through the "locked-down" position that the mapping process occurs. The video projector 30 can be secured at the location 31 via any means possible, including bolting, brackets, clamping, screwing, nailing, gluing, magnetism, etc. Moreover, the video projector 30 can be secured so as to be easily removable from the location 31 or it can be fixedly attached thereto.

Once the projector device is "locked-down," the projector device 30 is operably connected to the laptop computer 10 as described above, thereby completing step 925 of FIG. 9. The laptop computer 10 has a video post-production compositing program loaded thereon, which in this embodiment is Adobe® After Effects®.

Figure 2A:
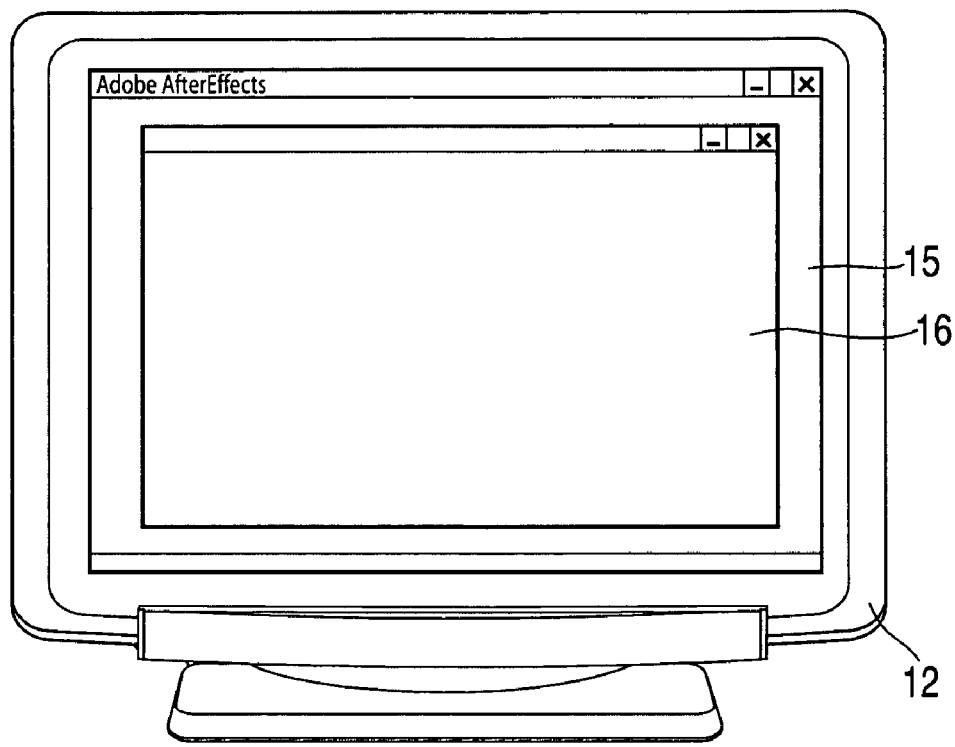
FIG. 2A is a view of the computer monitor of FIG. 1 displaying a video compositing application having an empty white composition window opened.
Figure 2B:
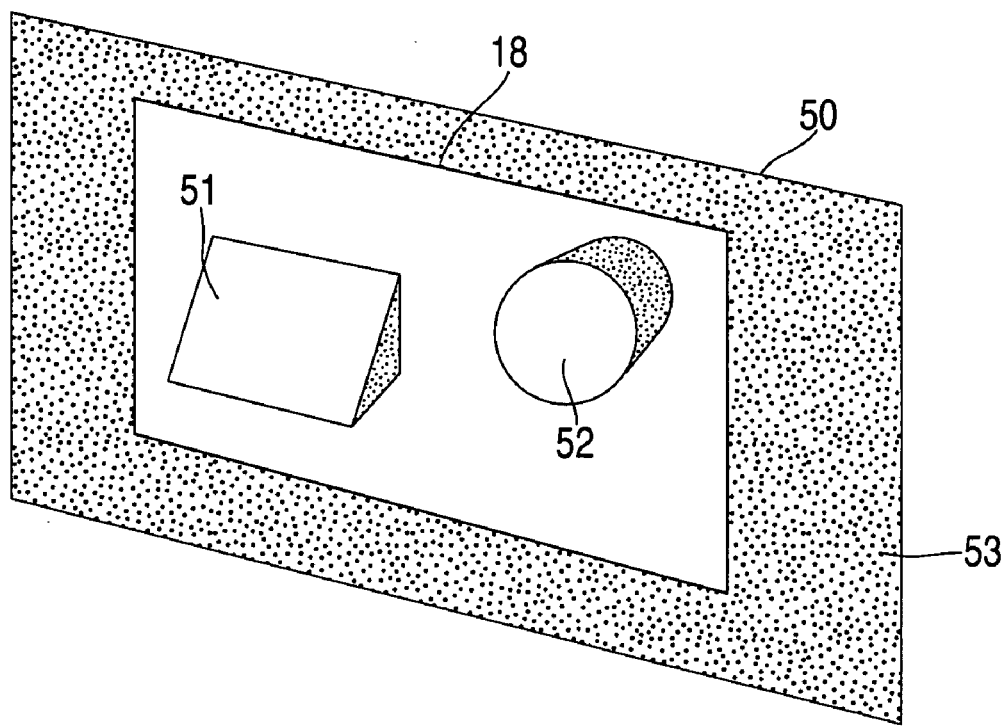
FIG. 2B is a perspective view of the architecture of FIG. 1 having the empty white video composition window of FIG. 2A projected thereon.

Referring now to FIGS. 2A and 2B, once the projector device 30 is "locked-down" and the image projection system 100 is set up, the user activates/opens the Adobe® After Effects® application 15 on the laptop computer 10. All user commands on the laptop computer 10 are inputted via traditional input means, such as a mouse, keyboard, etc. All of Adobe® After Effects' software applications, tools, and controls are performed by selecting and executing the proper commands within the various interfaces, toolbars, menus, icons, etc of the Adobe® After Effects® application. Those skilled in the art will appreciate that software applications that are equivalent to Adobe® After Effects® can be used, and that such applications will often refer to functions and interfaces that are equivalent to those described herein by different names.

Once the Adobe® After Effects® application 15 is opened, the user opens a composition window 16. Because the laptop computer 10 is operably coupled to the video projector 30, activating a "line video preview" command will project the contents of the composition window 16 onto the architecture 50 in real time (as shown in FIG. 2B). Thus, changing the content of the composition window 16 will result in corresponding changes to the imagery being projected onto the architecture 50. When initially opened, the composition window 16 is empty and white. Thus, the white composition window 16 is projected onto the architecture 50 as a white rectangular area 18, as illustrated in FIG. 2B.

The white rectangular area 18 covers the rectangular surface 51, the circular surface 52, and a portion of the flat surface 53. The surfaces (or portions thereof) of the architecture 50 that are not being projected onto are shaded gray throughout this application. If desired, and if necessary to capture all of the desired surfaces of the architecture 50, the size of the white rectangular area 18 can be increased by increasing the distance between the architecture 50 and the video projector 30.

Figure 3A:
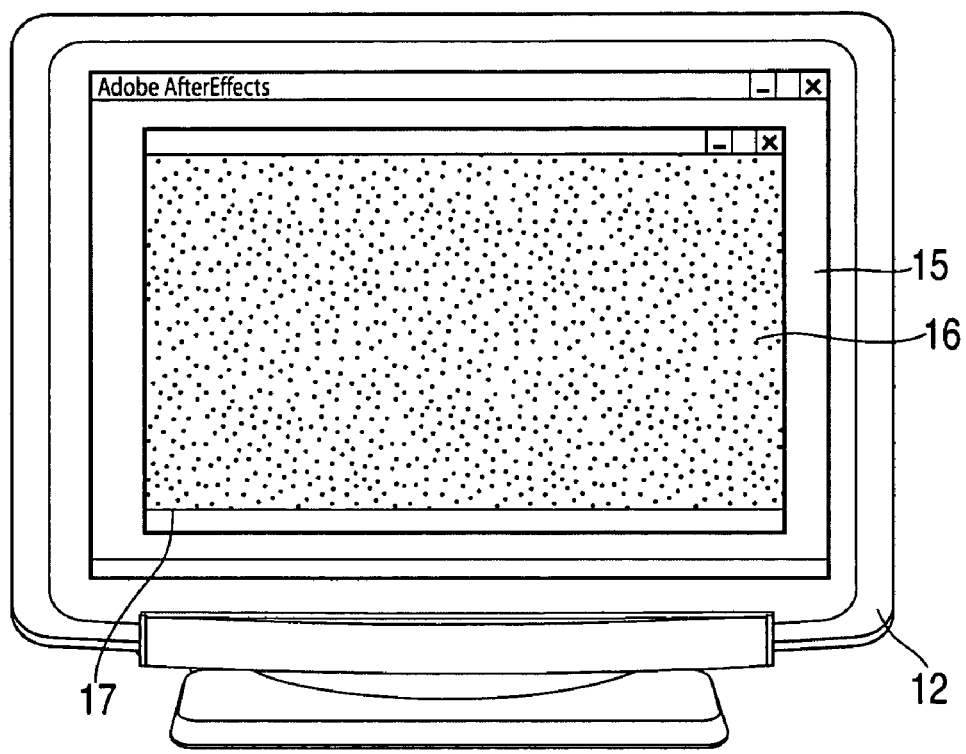
FIG. 3A is a view of the composition window having a black masking background applied.
Figure 3B:
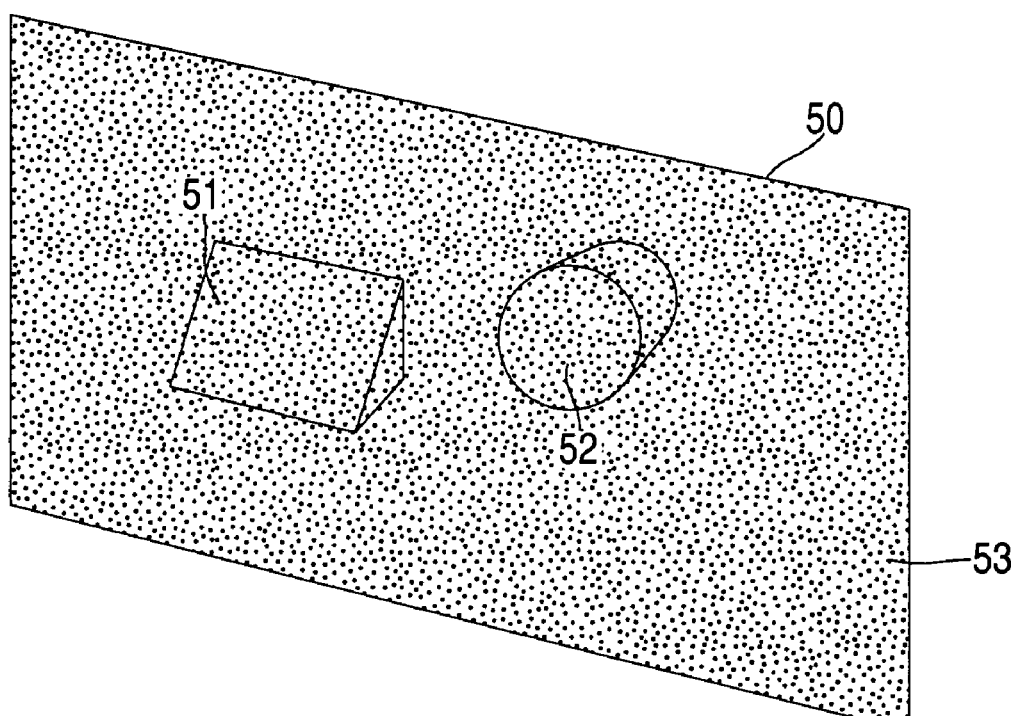
FIG. 3B is a perspective view of the architecture of FIG. 1 having the contents of the video composition window of FIG. 3A projected thereon.

Referring now to FIGS. 3A and 3B, once the composition window 16 is opened and it is determined that the projection of the blank window 16 fully covers the desired surfaces of the architecture 50, a black masking background layer 17 is applied to the composition window 16. The application of the black masking background layer 17 creates the illusion of an absent video projector/feed. In other words, the negative space is projected as black and it appears as though there is no projection onto the architecture 50, as exemplified in FIG. 3B. The higher the contrast ratio of the projector, the more convincing the illusion appears to be. This technique breaks the bounds of traditional video that is confined to the 3:4 aspect ratio.

Figure 4A:
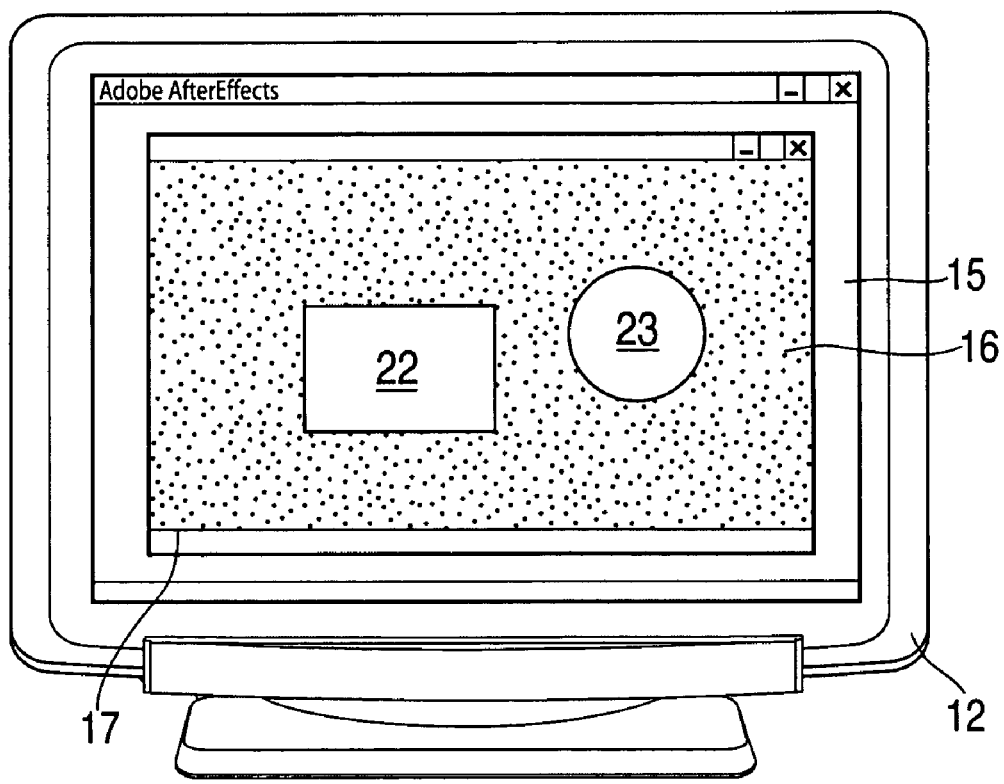
FIG. 4A is a view of the composition window having a blank rectangular matte and a blank circular matte inserted atop the black masking background.
Figure 4B:
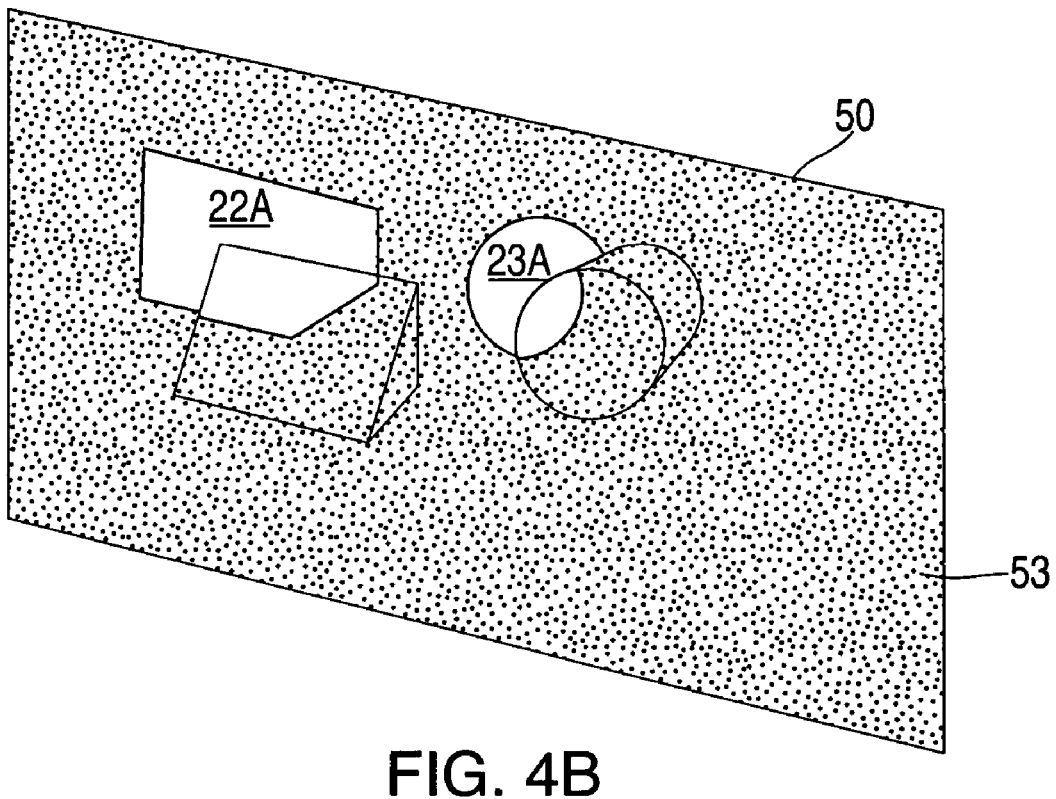
FIG. 4B is a perspective view of the architecture of FIG. 1 having the contents of the video composition window of FIG. 4A projected thereon, wherein the projected images of the blank mattes are not aligned with the desired surfaces of the wall and experience substantial optical distortion.
Figure 5A:
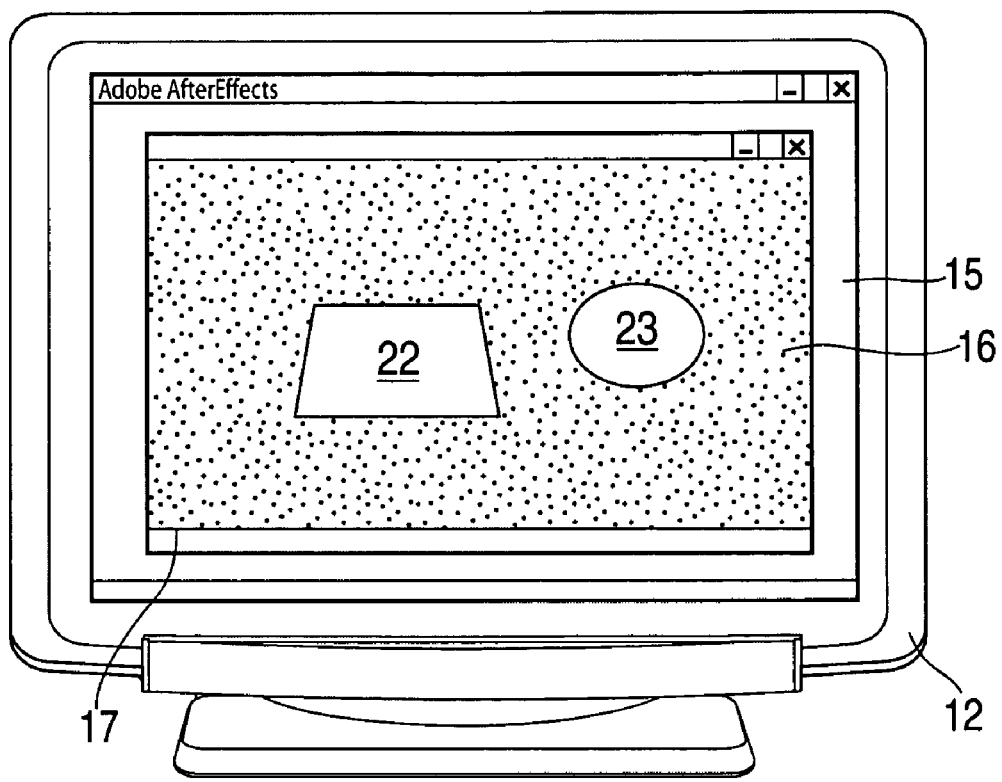
FIG. 5A is a view of the composition window wherein the shape and position of the blank rectangular matte and the blank circular matte have been adjusted so that the projected images of the blank mattes are aligned with and overly the desired surfaces of the wall.
Figure 5B:
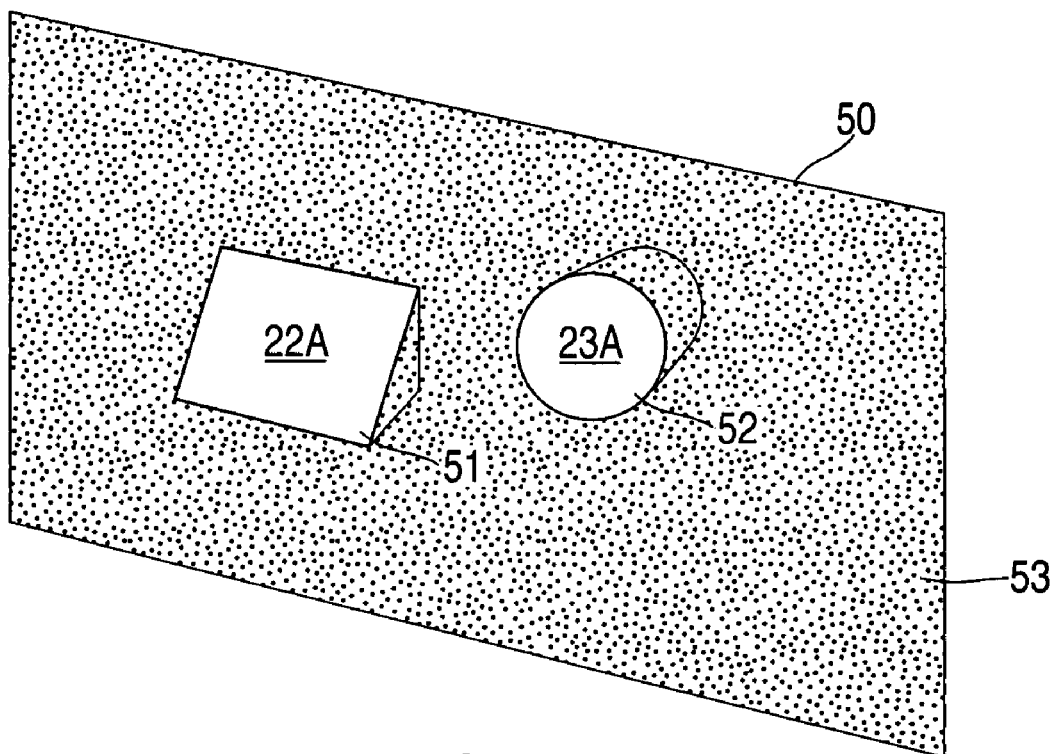
FIG. 5B is a perspective view of the architecture of FIG. 1 having the contents of the video composition window of FIG. 5A projected thereon.

Referring now to FIGS. 4A and 4B, once the black masking background layer 17 is applied to the composition window 16, a blank rectangular matte 22 and a blank circular matte 23 are inserted into the composition window 16 atop the black masking background layer 17, thereby completing step 935 of FIG. 9. The user may insert these mattes 22, 23 into the composition window 16 through a video projection function, or similar function of the software application. The shape, size, and position of the blank mattes 22, 23 in the composition window 16 are roughly approximated to correspond to the shape, size, and location of the surfaces of the architecture 50 on which it is desired to project imagery content. For this example, the desired surfaces of the architecture 50 are the rectangular surface 51 and the circular surface 52 respectively.

As shown in FIG. 3B, images of the blank mattes 22, 23 are projected onto the architecture 50 as images 22A, 23A respectively in real time. However, because the projection angle of the projector device 30 is not normal to the display surfaces 52, 51, and because the blank mattes 22, 23 are not properly positioned within the composition window 16, the projected images 22A, 23A experience substantial optical distortion.

Referring now to FIGS. 4A and 4B, the user then begins to adjust the size, shape, position, orientation, or any combination thereof of the blank mattes 22, 23 within the composition window 16 so that the projected images 22A, 23A are aligned with and overly the display surfaces 51, 52 respectively. This is done by the user adjusting the edges of the mattes 22, 23 within the composition window 16 and visually observing the real time effect that such adjustments have on the location and orientation of the edges of the projected images 22A, 23A on the architecture 50. This process is continued until all of the edges of the projected images 22A, 23A coincide with the edges of the display surfaces 51, 52 of the architecture 50, thus completing step 940 of FIG. 9. By precisely aligning the edges of the projected images 22A, 23A with the edges of the display surfaces 51, 52, the edges of the projected images 22A, 23A are invisible to a viewer and it appears as if the projected images 22A, 23A perfectly conform to the display surfaces 51, 52. As necessary, software tools such as rotating, scaling, corner pinning, skewing, positioning, or any combination thereof can be used. This procedure is performed for all surfaces of the architecture 50 that are to be projected onto. As necessary, additional blank mattes can be added to the composition window 16 and sized accordingly.

Figure 6A:
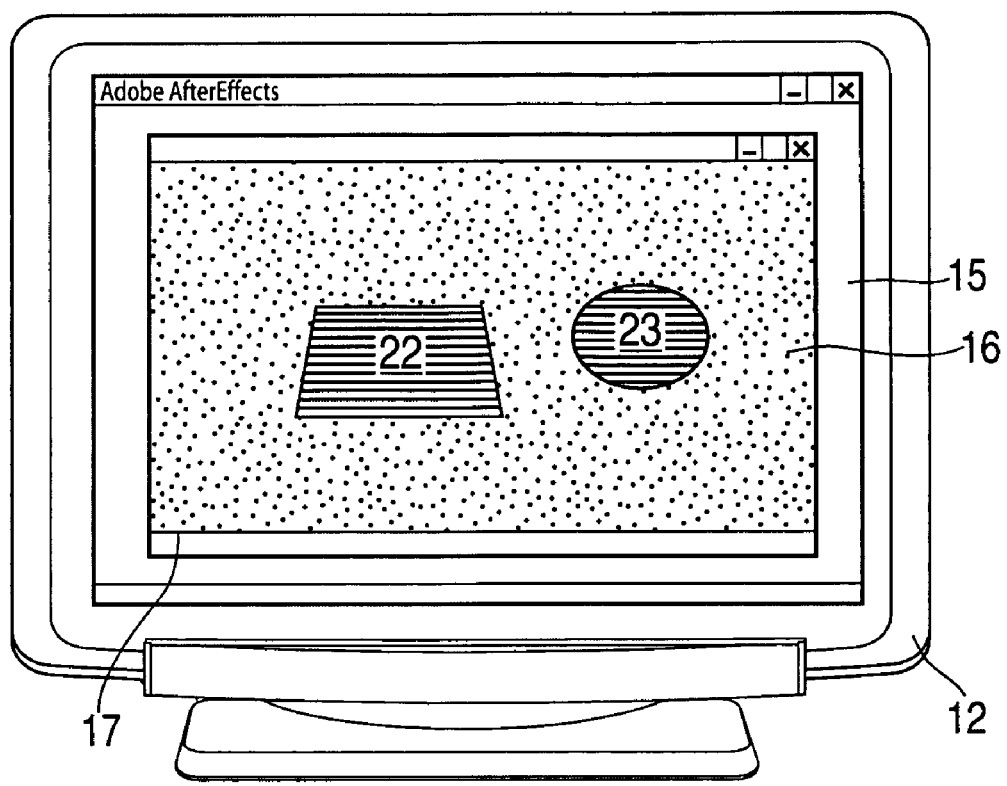
FIG. 6A is a view of the composition window wherein striped imagery has been added to the blank rectangular matte and the blank circular matte.
Figure 6B:
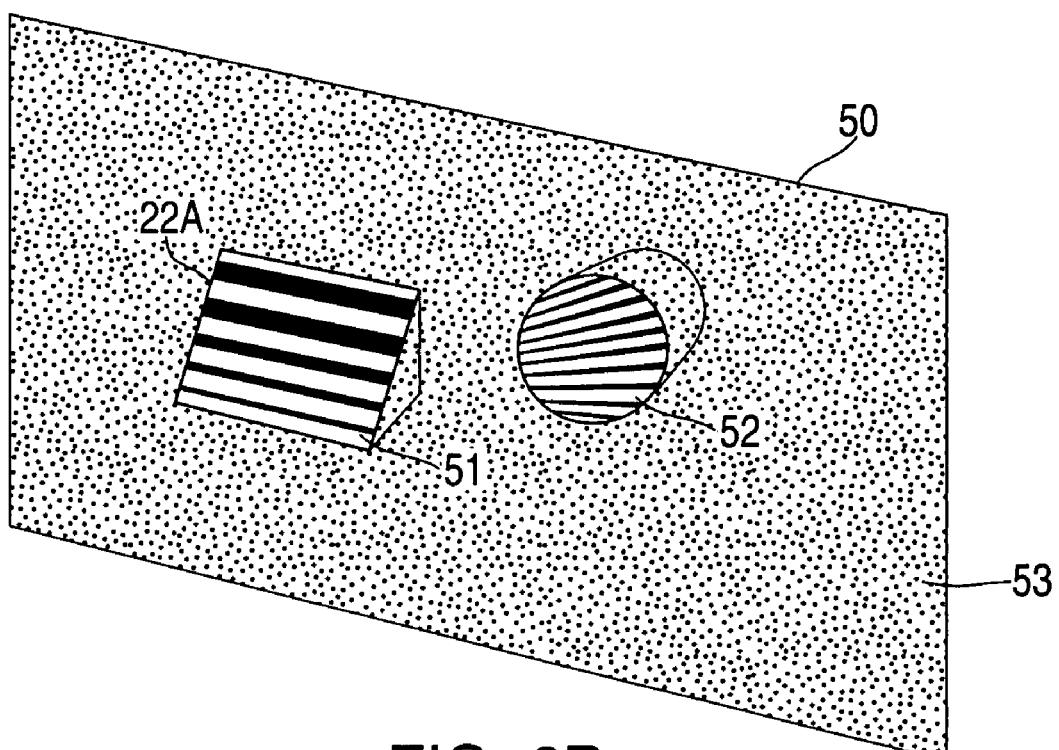
FIG. 6B is a perspective view of the architecture of FIG. 1 having the contents of the video composition window of FIG. 6A projected thereon, wherein the striped imagery of the mattes experience substantial optical distortion.

Referring now to FIGS. 6A and 6B, once all of the necessary blank mattes are inserted into the composition window 16 and properly adjusted so that their projected images are properly aligned with and overlay the desired display surfaces, imagery content is inserted into the mattes 22, 23. In the example, equally spaced horizontal stripes have been added to the mattes 22, 23. While the imagery content is exemplified as simple static stripes, the invention is not so limited. The imagery content can include, without limitation, still photographs, video clips, still digital images, streaming digital video, movies, or any other visual content.

Because the projection angle of the projection device 30 is not normal to the non-coplanar and non-adjacent display surfaces 51, 52, the projection of the imagery content on the display surfaces 51, 52 experiences substantial optical distortion (visible in FIG. 6B). While the projection of the imagery content is visibly distorted, it should be noted that the imagery content is still properly aligned with and overlays the display surfaces 51, 52. This is because the projection of the imagery content is limited to the space within the projected images 22A, 23A of the mattes 22, 23, which were sized and oriented in the steps described above.

The optical distortion of the projected imagery content on the display surfaces 51, 52 can be detected by visual inspection. For example, it can be seen that the stripes projected onto the rectangular surface 51 are not of equal width and are not spaced apart equally. Similarly, the stripes projected onto the circular surface 52 are not equally spaces and are diverging. This "skewing" is the result of the display surfaces 51, 52 being angled with respect to the video projection line. In some instances, the optical distortion of the projected imagery content may be visually detected by viewing the architecture 50 as a whole, and evaluating the continuity of the projected imagery content as it appears on the various surfaces 51-53 of the architecture 50.

Figure 7A:
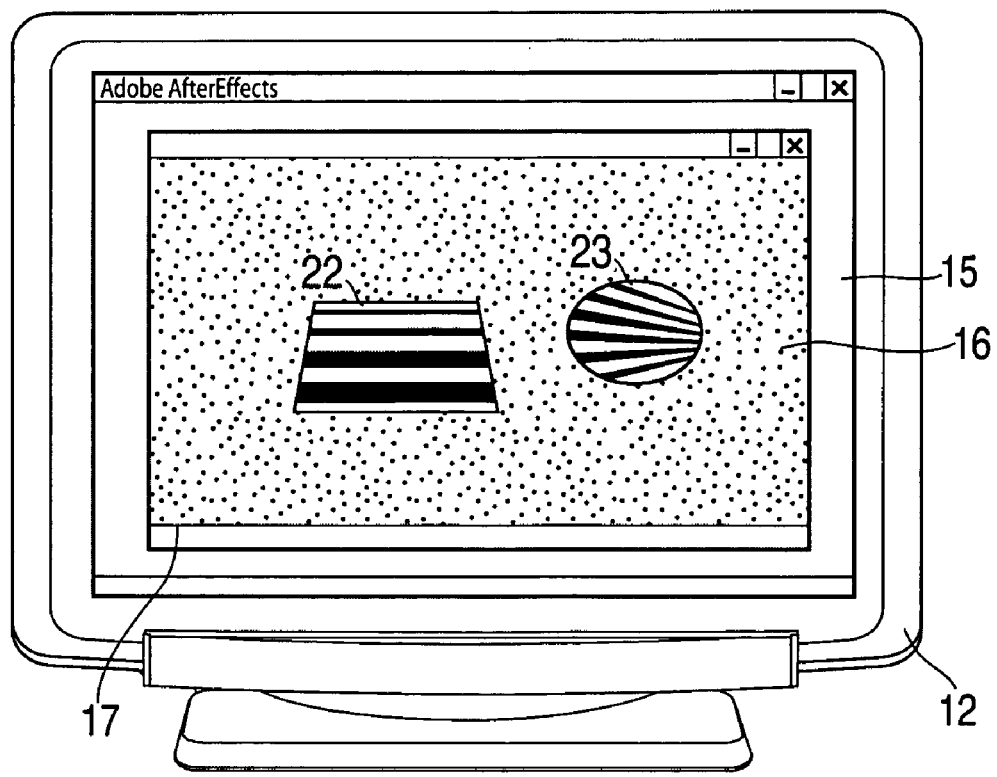
FIG. 7A is a view of the composition window wherein the internal properties of the rectangular and circular mattes have been adjusted so that the projected striped imagery content is not optically distorted.
Figure 7B:
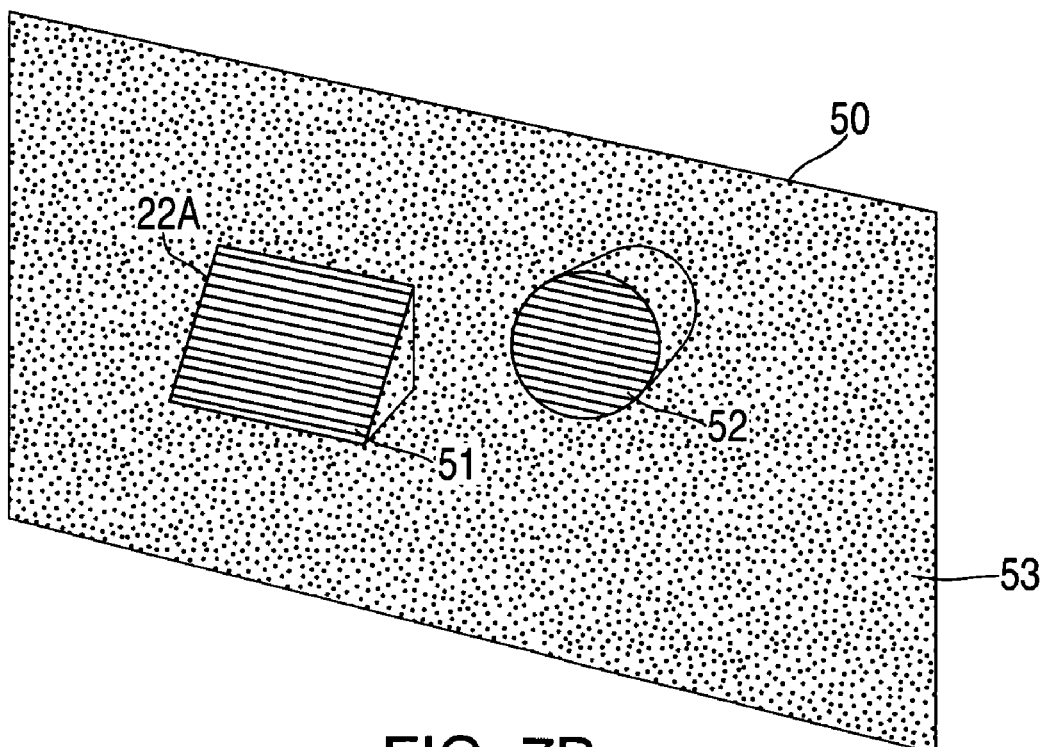
FIG. 7B is a perspective view of the architecture of FIG. 1 having the contents of the video composition window of FIG. 7A projected thereon.

Referring now to FIGS. 7A and 7B, upon the user determining that the projected imagery content is experiencing optical distortion, the user adjusts the internal properties of the mattes 22, 23 to compensate for the optical distortion. This is done by using tools within the video compositing application, including, without limitation, rotating, scaling, corner pinning, general positioning, skewing, or any combination thereof. Adjusting the internal properties of the mattes 22, 23 results in a corresponding change in how the imagery content is projected onto the display surfaces 51, 52 in real time. As mentioned above, this is made possible by using the live video preview function of the video compositing application. Such correction would be especially effective when utilizing text imagery in the projections.

As the user adjust the internal properties of the mattes 22, 23, he/she visually observes the effect that such adjustments have on the resulting projection of the imagery content on the display surfaces 51, 52. The user continues to adjust the properties of the mattes 22, 23 until the optical distortion of the projected imagery content on the display surfaces 51, 52 is minimized and/or eliminated. As can be seen by comparing FIGS. 7A and 7B, despite the striped imagery content appearing distorted in the mattes 22, 23 of the composition window 16, the projection of the striped imagery content within the images 22A, 23A on the display surfaces 51, 52 appears undistorted. This completes step 945 of FIG. 9.

This completes the mapping procedure. The general layout of the composition window 16 (i.e. the map), including the matte coordinates and the internal properties of each matte can then be saved for future use. The user can then utilize the saved map in the future to insert any piece of imagery content and/or change the imagery content as desired. As a result, the user can easily change the imagery content to be projected onto the architecture 50 without having to go through the mapping procedure by simply inserting new imagery content into the mattes. The internal matte properties will automatically be applied to the new imagery content.

Once the map and desired imagery content is inserted into the mattes 22, 23, a loop is designed and rendered within the video compositing application to effectuate continuous play of the imagery content. The content of the composition window 16, including the looped imagery content, is compressed, e.g., in a mpeg-2 format, and then burned onto a DVD, thereby completing step 950 of FIG. 9.

Referring now to FIG. 8, the laptop 10 and A/V converter 20 are then disconnected, and a DVD player 40 is operably connected to the video projector 30, completing step 955 of FIG. 9. The DVD on which the video clip was saved is then inserted into the DVD player 40 and played. The imagery content of the composition window 16 is retrieved from the DVD and projected onto the architecture 50 in a looped fashion via the video projector 30, completing step 960.

As yet another illustration of an embodiment of the present invention, a user is capable of incorporating the previous application of the masking process into the metal surfaces or cells (i.e., discernible portions of walls, ceiling, floors and general surfaces). Where masking, or use of black, is the major effect needed, e.g., the user does not want to project on the mirrors or elements other than specific surfaces such as metal surfaces, white surfaces, etc. A user would then utilize a video compositing application or a similar program to create video maps that were black and white, black where there is to be no imagery and white where there is to be video and imagery.

Unlike conventional video projection devices that employ "keystone" distortion correction techniques, "lens-shifting" techniques, or similar distortion correcting techniques, the present invention can compensate for multiple instances of distortion on multiple non-coplanar and non-contiguous surfaces within a three-dimensional area. In addition, the present invention can create a masking effect, which creates the illusion of blackness on surfaces upon which the user does not want to project video and images or on areas with no surfaces to project upon.

While the invention has been described and illustrated in sufficient detail that those skilled in this art can readily make and use it, various alternatives, modifications, and improvements should become readily apparent without departing from the spirit and scope of the invention. For example, entirely different and unrelated imagery content can be inserted into different mattes for simultaneous projection onto different surfaces of the same architecture. Moreover, the invention is not limited to any specific software but can be carried out on any software application capable of carrying out the aforementioned functions.

What is claimed is:

1. A method of mapping and/or projecting imagery onto a three-dimensional architecture comprising:
   a) identifying a projection location from which a line of sight exists to one or more desired surfaces of the architecture;
   b) securing a projection device in a fixed orientation in the projection location;
   c) operably coupling the projection device to a computer device, the computer device comprising a video compositing application;
   d) opening a composition window of the video compositing application, the composition window being displayed on a display module;

e) projecting content of the composition window onto the architecture;

f) inserting a matte into the composition window, an image of the matte being projected onto the architecture; and g) adjusting the size, shape, position, orientation or any combination thereof of the matte within the composition window until edges of the projected image of the matte become aligned with edges of one of the desired surfaces of the architecture.

2. The method of claim 1 further comprising repetitively performing steps e) through g) for all desired surfaces of the architecture.

3. The method of claim 2 further comprising inserting imagery content into one or more of the mattes, the imagery content being projected onto the surface of the architecture corresponding to the matte in which the imagery content is inserted.

4. The method of claim 3 further comprising adjusting internal properties of those mattes whose imagery content is projected onto angled, non-coplanar, and/or non-planar surfaces of the architecture to substantially alleviate optical distortion.

5. The method of claim 4 wherein the adjustment of the properties of the mattes is performed by adjusting the properties of the mattes within the composition window and visually monitoring the effect that the adjustment has on the optical distortion of the projected imagery content on the architecture.

6. The method of claim 4 further comprising storing content of the composition window to a memory medium.

7. The method of claim 4 wherein the adjusting step comprises rotating, scaling, corner pinning, skewing, or any combination thereof.

8. The method of claim 1 further comprising providing a black masking background layer in the composition window prior to inserting a matte.

9. The method of claim 1 wherein the alignment of the edges of the projected image of the matte with the edges of the corresponding desired surfaces of the architecture is performed by adjusting the edges of the matte within the composition window and visually monitoring the effect that the adjustment has on position of the edges of the projected image of the matte on the architecture in real time.

10. The method of claim 1 wherein the computer device is a lap top computer and the projector device is a video projector, the lap top computer operably coupled to the video projector using an analog-digital converter.

11. The method of claim 1 further comprising:
repetitively performing steps e) through g) for all desired surfaces of the architecture,
wherein the alignment of the edges of the projected image of the matte with the edges of the corresponding desired surface of the architecture is performed by adjusting the edges of the matte within the composition window and visually monitoring the effect that the adjustment has on position of the edges of the projected image of the matte on the architecture in real time;
inserting imagery content into one or more of the mattes, the imagery content being projected onto the surface of the architecture corresponding to the matte in which the imagery content is inserted;
adjusting properties of those mattes whose imagery content is projected onto angled, non-coplanar, and/or non-planar surfaces of the architecture to substantially alleviate optical distortion;

wherein the adjustment of the properties of the mattes is performed by adjusting the properties of the mattes within the composition window and visually monitoring the effect that the adjustment has on the optical distortion of the projected imagery content on the architecture in real time;

storing content of the composition window including all imagery content associated with the mattes to a memory medium;

disconnecting the computer device from the projector device;

connecting an electronic device capable of reading the memory medium to the projector device;

coupling the portable memory medium to the electronic device; and projecting the content of the composition window onto the architecture.

12. The method of claim 11 wherein the imagery content in the mattes is looped.

13. A system for mapping and/or projecting imagery onto non-coplanar surfaces of a three-dimensional architecture comprising:

a) a projection device secured in a fixed orientation at a location from which a line of sight exists to one or more desired surfaces of the architecture;

b) a computer device having a display module and a video compositing application, the computer device operably coupled to the projector;

c) wherein the video compositing application comprises a composition window, wherein the computer device is adapted to transmit content of the composition window to the projector device for display on the architecture;

d) wherein the video compositing application comprises means for inserting a matte into the composition window; and e) wherein the video compositing application comprises means for adjusting the size, shape, position, orientation, or any combination thereof of the matte within the composition window, thereby resulting in edges of a projected image of the matte being correspondingly adjusted on the architecture in real time.

14. The system of claim 13 wherein the computer device is a lap top and the display module is a computer screen.

15. The system of claim 13 wherein the computer device is operably coupled to the projection device with an analog-digital converter.

16. The system of claim 15 wherein the analog-digital converter is a video camera.

17. The system of claim 13 wherein the video compositing application comprises means for applying a black masking background layer to the composition window.

18. The system of claim 13 wherein the video compositing application comprises means for inserting imagery content into one or more of the mattes.

19. The system of claim 13 wherein the video compositing application comprises means for adjusting properties of mattes whose imagery content is projected onto angled, non-coplanar, and/or non-planar surfaces of the architecture to substantially alleviate optical distortion.

20. The system of claim 13 wherein the computer device further comprises means for storing the composition window onto a memory medium.

* * * * *